(12) United States Patent
Powell et al.

(10) Patent No.: US 7,367,262 B2
(45) Date of Patent: May 6, 2008

(54) SPIT HOLDER ASSEMBLY

(75) Inventors: Brian C. Powell, Dover, DE (US); Kenneth E. Reese, Townsend, DE (US)

(73) Assignee: Metal Masters Foodservice Equipment Co., Inc., Clayton, DE (US)

( * ) Notice: Subject to any disclaimer, the term of this patent is extended or adjusted under 35 U.S.C. 154(b) by 0 days.

(21) Appl. No.: 11/186,433

(22) Filed: Jul. 21, 2005

(65) Prior Publication Data

US 2007/0017385 A1    Jan. 25, 2007

(51) Int. Cl.
*A47J 37/00* (2006.01)
(52) U.S. Cl. .................. 99/421 V; 99/419
(58) Field of Classification Search ...... 99/419–421 V, 99/444–450, 482, 400, 401; 126/25 R, 9 R
See application file for complete search history.

(56) References Cited

U.S. PATENT DOCUMENTS

| | | | |
|---|---|---|---|
| 2,286,394 A | * | 6/1942 | Togut .................. 99/421 H |
| 3,028,802 A | * | 4/1962 | Schneider .............. 99/421 HV |
| 3,297,166 A | * | 1/1967 | Summers .................. 211/60.1 |
| 4,089,258 A | | 5/1978 | Berger |
| 5,445,063 A | * | 8/1995 | Sherman .................. 99/421 H |
| 5,445,064 A | * | 8/1995 | Lopata .................... 99/421 H |
| 5,465,653 A | * | 11/1995 | Riccio .................... 99/421 H |

* cited by examiner

*Primary Examiner*—Timothy F. Simone
(74) *Attorney, Agent, or Firm*—Connolly Bove Lodge & Hutz LLP

(57) ABSTRACT

A spit holder assembly comprises a longitudinally oriented hollow body having a triangular cross section and opposite ends, and an outwardly directed transverse flange connected to the body between the opposite ends thereof. A lower portion of the body on one side of the transverse flange comprises a base constructed and arranged to fit within an opening in a worktable with the flange functioning as a stop. An upper portion of the body on the other side of the flange includes at least a pair of spaced apart longitudinally oriented slots constructed and arranged to receive and hold a spit.

6 Claims, 4 Drawing Sheets

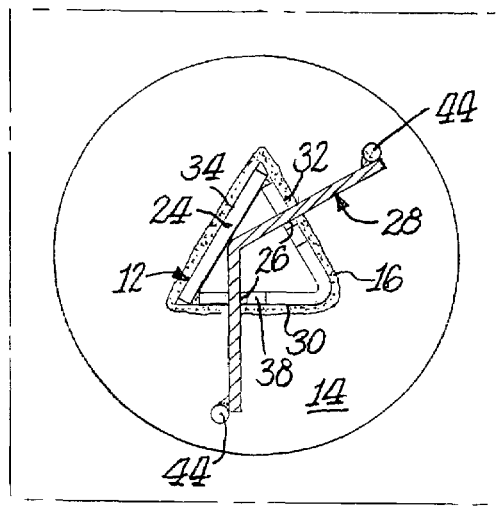
Fig. 3.
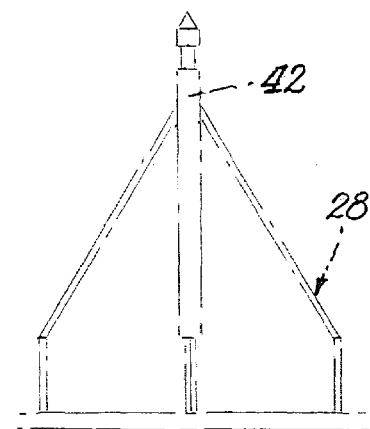
Fig. 1.
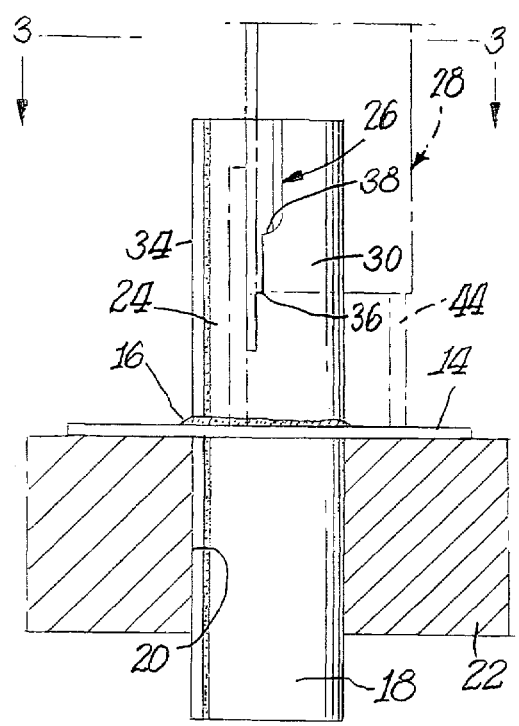
Fig. 2.
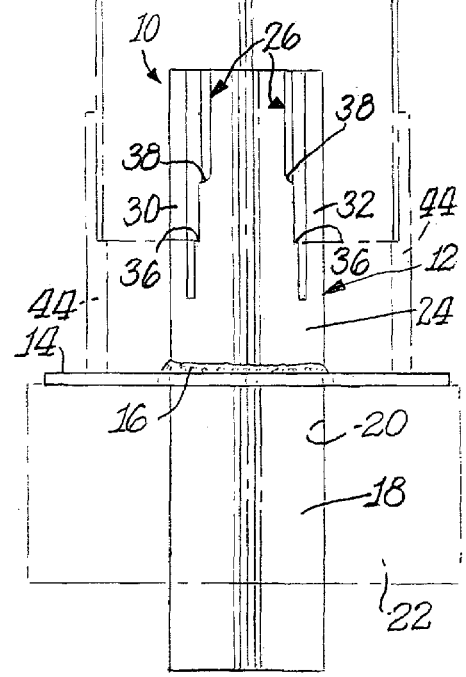

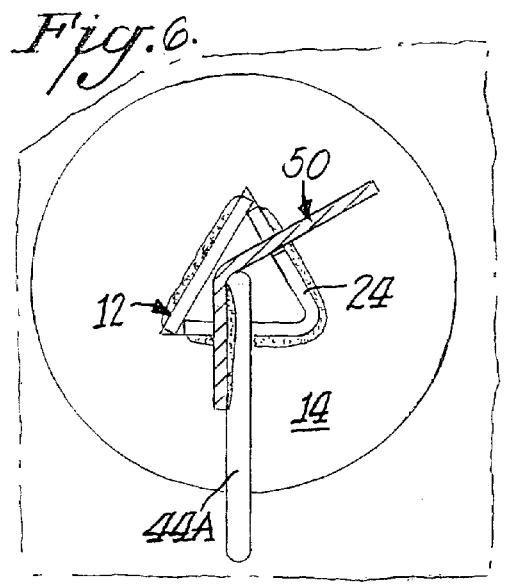
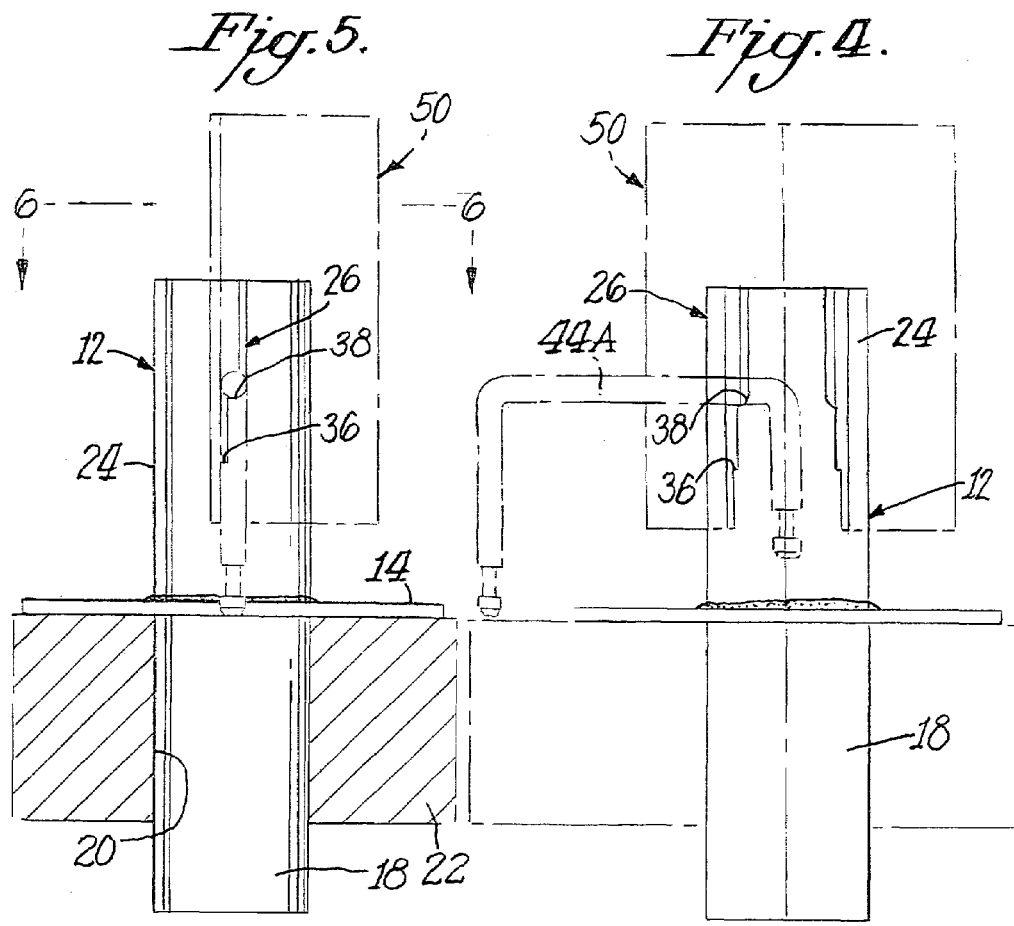

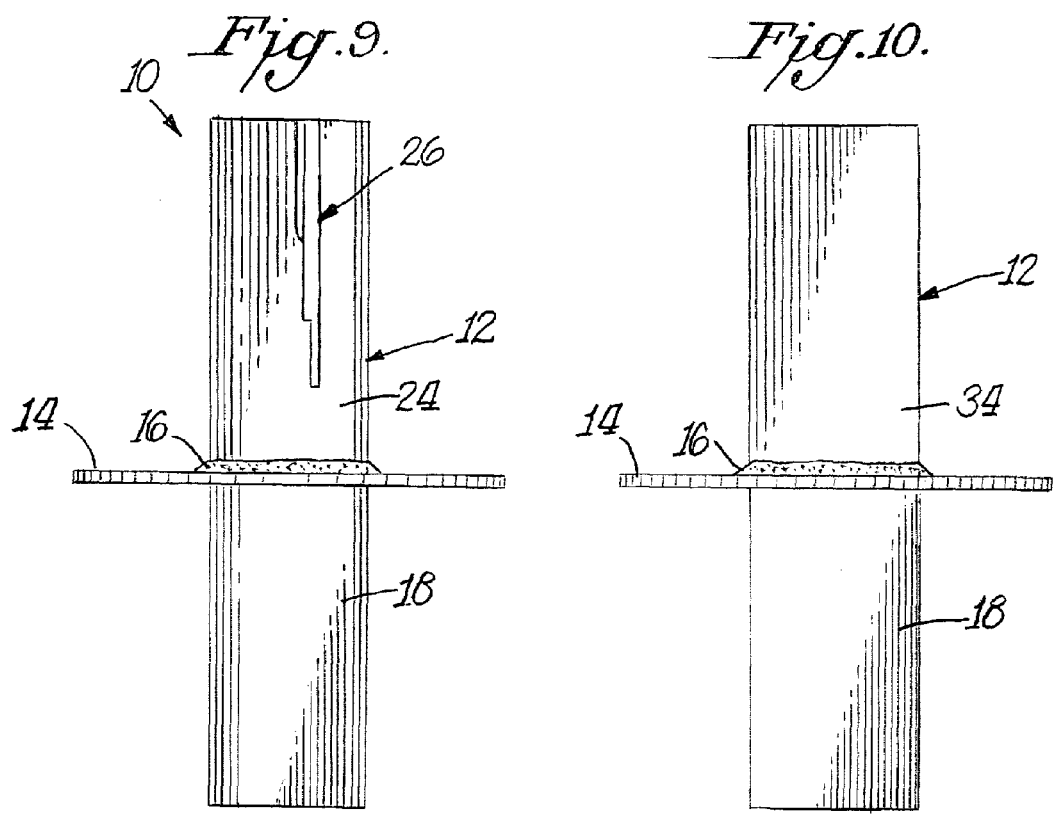

SPIT HOLDER ASSEMBLY

BACKGROUND OF THE INVENTION

The present invention relates to a spit holder assembly for holding rotisserie spits in an upright position for the purpose of placing food items to be cooked onto the spit prior to positioning the spit in the rotisserie.

Commercially available rotisseries are often used to cook chickens and the like for sale in retail and restaurant establishments. Henny Penny and Hobart are among the manufacturers who produce rotisseries for this purpose. Generally these rotisseries include a pair of spaced apart upright rotisserie wheels and spits are connected between the wheels for rotation during rotisserie operation. These spits are often lengthy and when chickens and other food items are impaled upon the spits they can be both heavy and bulky. Also, under some circumstances it is difficult for one person to impale a plurality of chicken on one spit. Accordingly, there is a real need for an arrangement that anchors the spit in a vertically oriented position so that the food can easily be impaled upon the spit prior to positioning between the spit wheels of the rotisserie.

SUMMARY OF THE INVENTION

Accordingly, one of the objects of the present invention is a spit holder assembly which functions to hold a spit in an upright position in order to place food items to be cooked onto the spit prior to placement in a rotisserie.

Another object of the present invention is a spit holder assembly which is simple in construction and easy to use for its intended purpose.

In accordance with the present invention, a spit holder assembly comprises a longitudinally oriented hollow body triangular in cross section, having opposite ends and an outwardly directed transverse flange connected to the body between the opposite ends thereof. A lower portion of the body on one side of the transverse flange comprises a base constructed and arranged to fit within an opening in a worktable with the flange functioning as a stop. The upper portion of the body on the other side of the flange includes at least a pair of spaced apart longitudinally oriented slots constructed and arranged to receive and hold a spit.

Preferably the hollow body, triangular in cross section has three sides, and one of the longitudinally oriented slots is located in one side while the other slot is located in one of the other two sides. Also, preferably at least one of the longitudinally oriented slots has a stepped pattern including at least two steps in order to receive and support spits of differing configuration.

The spit holder assembly of the present invention may be utilized in combination with a rotisserie spit having a V-shaped cross section with two longitudinal sides of the spit forming the V-shape. The lower end of one side of the spit rests within and is supported by one of the longitudinally oriented slots of the spit holder assembly while the lower end of the other side of the spit rests within and is supported by the other longitudinally oriented slot.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar reference characters refer to similar parts and in which:

FIG. 1 is a front elevational view of a spit holder assembly, in accordance with the present invention, with the spit holder assembly releasably mounted to a worktable and with a spit in the holder assembly;

FIG. 2 is a side elevational view of the spit holder assembly and spit shown in FIG. 1;

FIG. 3 is a sectional view taken along line 3-3 of FIG. 2;

FIG. 4 is a side elevational view similar to FIG. 1, but with the spit holder assembly supporting a differently configured spit;

FIG. 5 is side elevational view of the spit holder assembly and spit shown in FIG. 4;

FIG. 6 is a sectional view taken along lone 6-6 of FIG. 5;

FIG. 9 is a left side elevational view of the spit holder assembly;

FIG. 10 is a rear elevational view of the spit holder assembly;

FIG. 12 is bottom plan view of the spit holder assembly.

DETAILED DESCRIPTION OF THE INVENTION

Figure 11:
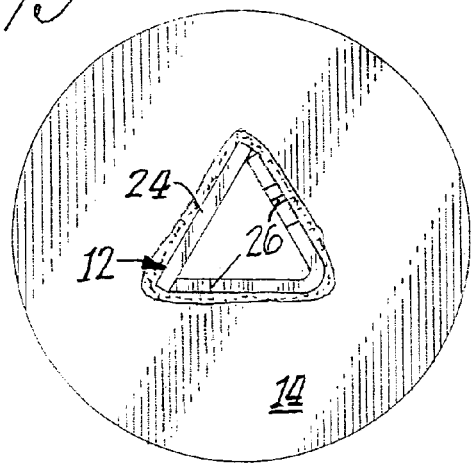
FIG. 11 is a top plan view of the spit holder assembly.

Referring in more particularity to the drawings, FIGS. 1-3 illustrate a spit holder assembly 10 comprising a longitudinally orientated hollow body 12 having a triangular cross section and opposite ends. An outwardly directed transverse flange 14 is connected by weld 16 to the body 12 midway between the opposite ends of the hollow body. The lower portion 18 of the hollow body 12 on one side of the transverse flange 14 comprises a base constructed and arranged to fit within an opening 20 of a worktable 22. The upper portion 24 of the hollow body 12 on the other side of the transverse flange 14 includes at least a pair of spaced apart longitudinally oriented slots 26 constructed and arranged to receive and hold a rotisserie spit 28 in an upright position, as explained more fully below.

As shown in FIG. 3, the hollow body 12 has a triangular cross section with three sides 30, 32, 34. One of the longitudinally oriented slots is located in side 30 and the other slot 26 is located in side 32. Sides 30, 32 are integral with one another while the third side 34 is a separate piece welded to sides 30, 32. In the formation of the spit holder assembly, sides 30, 32 may be initially planar and the slots 26 therein may be formed by laser machining techniques while the sides are in a flat condition. Other known machining techniques may also be utilized to form the slots. After such slot formation the sides 30, 32 may be bent into a V-shape, and the third side 34 may then secured thereto by welding. The only other formation step of the assembly 10 involves securing the transverse flange 14 to the hollow body 12 by weld 16.

Each longitudinally oriented slot 26 has a stepped pattern that includes at least two steps 36, 38. As such, the spit holder assembly 10 is adapted to receive and support a variety of rotisserie spits, as explained more fully below.

Rotisserie spit 28 generally comprises a longitudinal body 40 having a V-shaped cross section, as shown in FIG. 3. The upper end of the spit includes a single outwardly directed pin 42 and the lower end of the spit includes a pair of spaced apart pins 44. These pins are received within openings in the upright rotisserie wheels between which the spit 28 is positioned for rotisserie cooking. Spit 28 fits within the slots 26 so that the blades of the spit body 40 engage the first step 36 of the slots, and such positioning is clearly shown in FIGS. 1 and 2.

The spit holder assembly 10 is also shown in FIGS. 4-6, but the particular rotisserie spit 50 held and supported by the assembly is different. In this regard spit 50 has a V-shaped cross section, but the lower end of each of the spit blade rests at the bottom of the longitudinally oriented slots 26. Rotisserie spit 50 includes a slightly different pin arrangement 44A at the lower end thereof, and that pin arrangement is accommodated by the second step 38 in the longitudinally oriented slots. As noted above, the pin arrangement 44A is positioned within openings in one of the two spit wheels between which the spit is connected during rotisserie operation.

Fundamentally, the spit holder assembly 10 of FIGS. 4-6 is the same as shown in FIGS. 1-3, but FIGS. 4-6 illustrate a different spit construction 50 being held by the holder assembly in an upright position. One holder assembly 10 accommodates at least two different spits thereby making the holder universal. Moreover, other spit constructions may also be held and supported by the assembly. In all instances, once the rotisserie spit is so positioned within the holder assembly, the food items such as chickens and the like can easily be impaled upon the spit without the need to separately hold the spit during that operation. Once the spit is fully loaded it is simply removed from the holder assembly and placed between the rotisserie wheels of the rotisserie.

Figure 8:
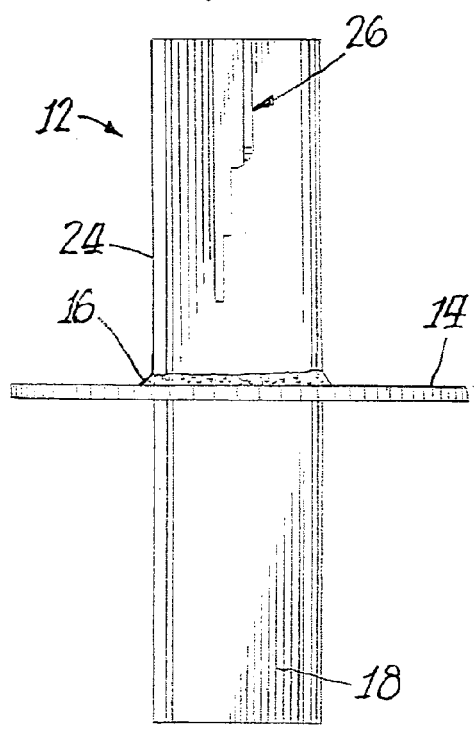
FIG. 8 is a right side elevational view of the spit holder assembly.
Figure 7:
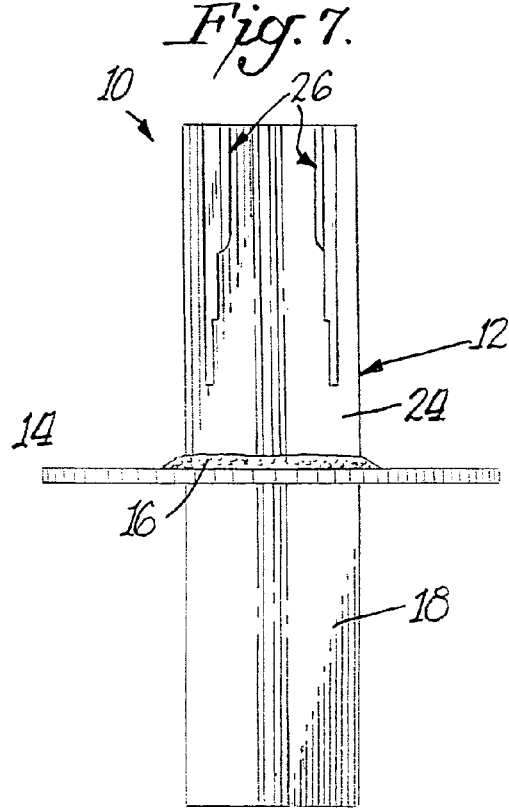
FIG. 7 is a front elevational view of the spit holder assembly shown in FIGS. 1-6.

FIGS. 7-12 simply show the full details of the spit holder assembly 10 without any spit being supported by the assembly.

We claim:

1. A spit holder assembly for supporting a spit in a vertical position for the purpose of placing food items on the spit prior to positioning the spit on or within a cooking device, the assembly comprising an upwardly extending longitudinally oriented hollow body having a triangular cross section and opposite upper and lower ends, an outwardly directed transverse flange connected to the body between the upper and lower ends thereof, a lower portion of the body on a lower side of transverse flange comprising a base constructed and arranged to fit within an opening in a worktable with the flange functioning as a stop, and an upper portion of the body on an upper side of the flange including at least a pair of spaced apart longitudinally oriented slots constructed and arranged to receive and hold a spit in an upright position.

2. A spit holder assembly as in claim 1 wherein the triangular cross section of the hollow body forms three sides, and wherein one of the slots is located in one side and another slot is located in one of the other two sides.

3. A spit holder assembly as in claim 1 wherein each of the longitudinally oriented slots has a stepped pattern.

4. A spit holder assembly as in claim 3 wherein the stepped pattern includes at least two steps.

5. A spit holder assembly as in claim 1 in combination with a rotisserie spit having a V-shaped cross-section with two longitudinal sides of the spit forming the V-shape, and one side of the spit resting within and supported by one of the longitudinally oriented slots of the spit holder assembly and the other side of the spit resting within and supported by another longitudinally oriented slot.

6. A spit holder assembly as in claim 1 in combination with a worktable having a substantially horizontal surface with an opening therein, and wherein the lower portion of the hollow body fits within the opening in the worktable and the lower side of the transverse flange engages the worktable.

* * * * *